J. D. HOWE.
CITRUS FRUIT PEEL, PULP, AND JUICE MACHINE.
APPLICATION FILED MAY 23, 1917.

1,244,331.

Patented Oct. 23, 1917.
3 SHEETS—SHEET 1.

INVENTOR
JOHN D. HOWE
BY Hazard & Miller
ATT'YS

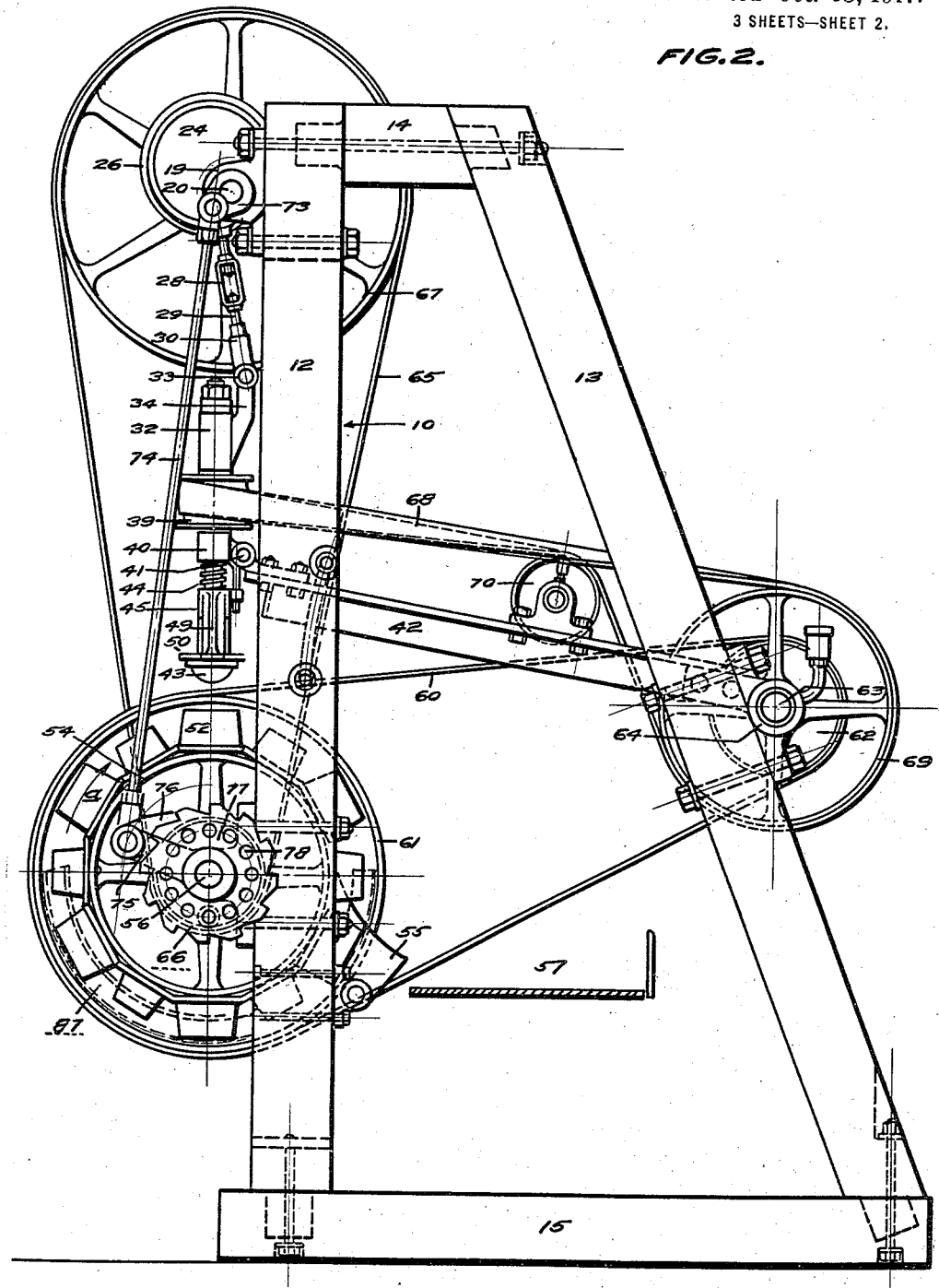

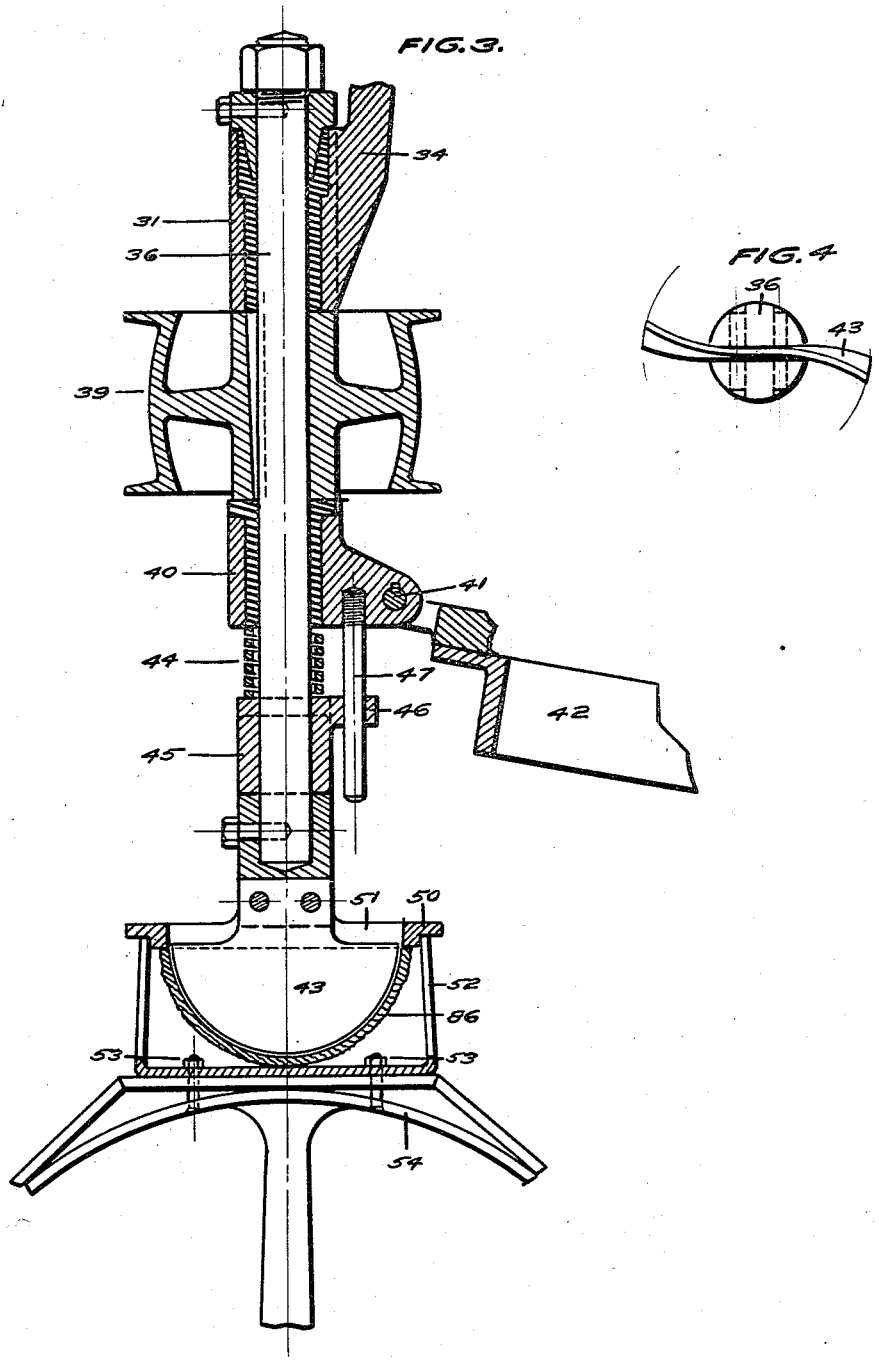

UNITED STATES PATENT OFFICE.

JOHN D. HOWE, OF UPLAND, CALIFORNIA.

CITRUS-FRUIT PEEL, PULP, AND JUICE MACHINE.

1,244,331. Specification of Letters Patent. Patented Oct. 23, 1917.

Application filed May 23, 1917. Serial No. 170,395.

*To all whom it may concern:*

Be it known that I, JOHN D. HOWE, a citizen of the United States, residing at Upland, in the county of San Bernardino and State of California, have invented new and useful Improvements in Citrus-Fruit Peel, Pulp, and Juice Machines, of which the following is a specification.

This invention relates to a machine for treating fruit and particularly pertains to an apparatus for removing the juice and pulp from citrus fruits.

It is the principal object of this invention to provide a machine within which the halves of citrus fruit may be placed and the pulp removed from the peel.

Another object of this invention is to provide cutting members which operate within the peel of citrus fruit and which will thoroughly remove the pulp therefrom without removing parts of the peel.

Another object of this invention is to provide means for automatically advancing and retracting said cutters to act upon the fruit.

Another object of this invention is to provide a chuck for receiving the fruit and automatic means for clamping it therein.

Another object of this invention is to provide a chuck drum upon which a series of sets of chucks may be arranged around the circumference of said drum and may be interchanged so that fruit of the same or different sizes may be treated in a continuous operation of the machine.

Another object of this invention is to provide means for automatically locking the drum while the cutters are acting upon the fruit positioned within the chucks thereon.

It is a further object of this invention to provide a device of the above character which is semi-automatic in its operation and is composed of parts of durable design and which may be easily assembled or dismantled as desired.

Other objects will appear hereinafter.

The invention is illustrated, by way of example, in the accompanying drawings in which:

Fig. 2 is a view in side elevation illustrating the machine disclosed in Fig. 1 and more clearly setting forth the power transmission means embodied within the structure.

Fig. 3 is a view in transverse section as seen on the line 3—3 of Fig. 1, illustrating in detail the cutting members as well as their driving connections and reciprocable mountings.

Fig. 4 is a view in end elevation of one of the cutting tools and discloses its spiral formation.

Figure 1:
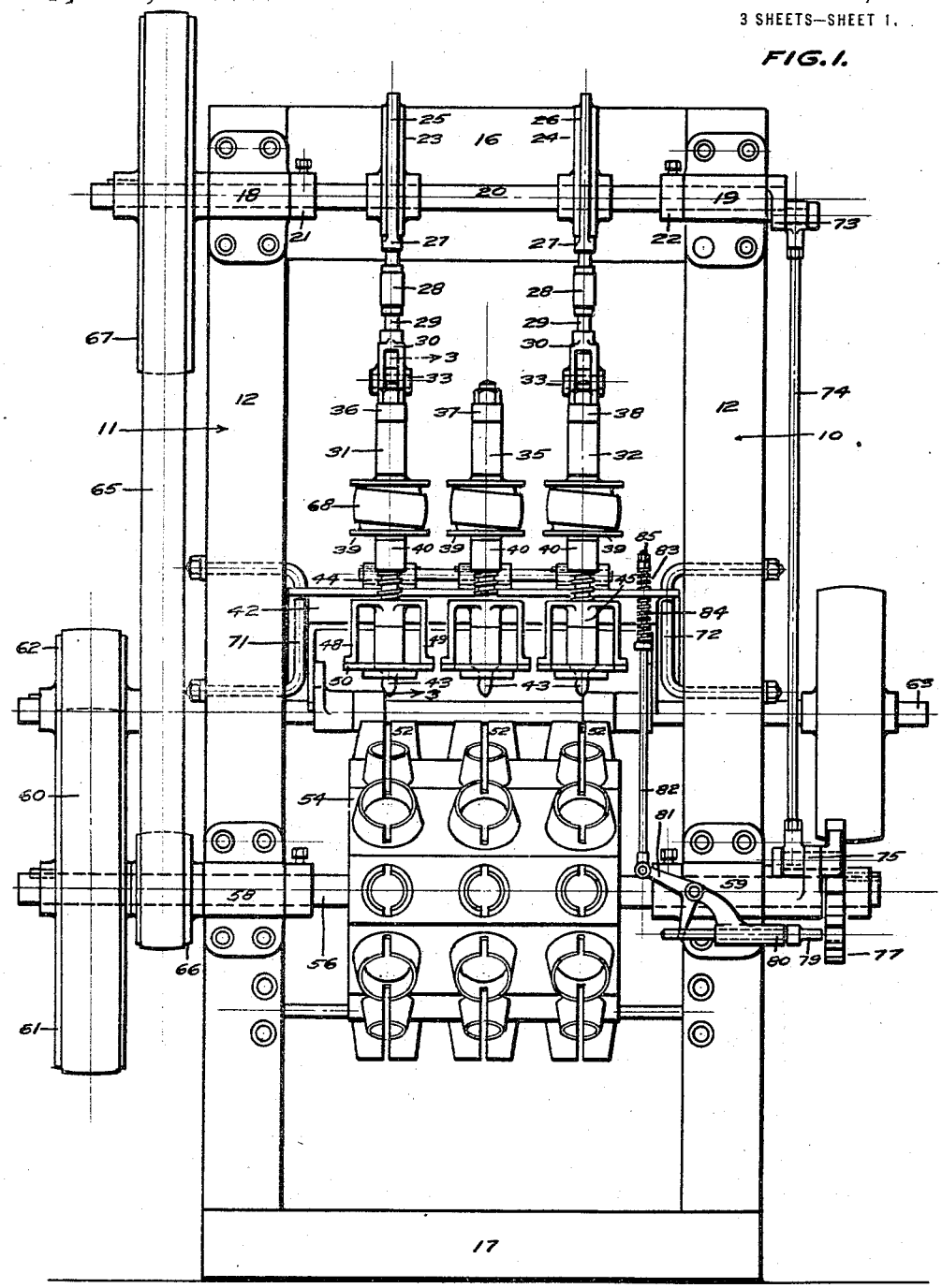
Figure 1 is a view in front elevation illustrating the assembled machine and particularly disclosing the relative positions of the chucks and the cutter members.

Referring more particularly to the drawings 10 and 11 indicate parallel vertical uprights which are composed of perpendicular beams 12, an inclined beam 13, and upper and lower connecting timbers 14 and 15. The uprights are rigidly secured in spaced relation to each other by beams 16 and 17 which unite the two members to form a frame upon which the mechanical elements of the apparatus are mounted. Secured adjacent the top of each of the posts 12 and upon the front face thereof are journal boxes 18 and 19 adapted to rotatably support an eccentric shaft 20. This shaft is horizontally disposed and is held in its proper position by spacing collars 21 and 22 which are mounted against the inner faces of the boxes. Fixed upon the shaft in spaced relation to each other are a pair of eccentric disks 23 and 24. These disks are mounted in the same relation to each other as far as their eccentricity to the axis of the shaft is concerned. Eccentric straps 25 and 26 are secured around the peripheries of the disks and are fitted with threaded downwardly extending shanks 27 which are engaged by a turnbuckle 28. The opposite end of the turnbuckle is engaged by a threaded pin 29 secured to a shackle member 30. These shackle members are separately secured, one to a vertical bearing 31 and the other to a similar bearing 32, by means of pivot pins 33. The pins 33 are particularly shown in Fig. 2 of the drawings as mounted within vertically extending brackets 34 cast integral and upon the rear side of each bearing.

The bearings 31 and 32, which are vertically disposed and spaced from each other, have a similar bearing 35 interposed between them and in parallel relation thereto. These bearings are provided for cutter shafts 36, 37 and 38 which are rotatably mounted in the bearings 32, 35 and 31, respectively. Each of these shafts is supplied with a flanged pulley 39 by which it is driven. The lower ends of each shaft are positioned within pivot brackets 40 which are in turn keyed on a pivot shaft 41 mounted upon a swinging frame 42, which will be hereinafter described. The shafts protrude through the brackets 40, and to their ends are secured cutting members 43. Directly beneath the bracket 40 and surrounding each shaft is a coil expansion spring 44 which bears against a hub 45. These hubs are formed with lugs 46 through which guide rods 47 may be reciprocated. At the opposite sides of the hubs and disposed at substantially ninety degrees to the lugs 46 are brackets 48 and 49 which support annular clamping flanges 50. These flanges are formed with circular central openings 51 within which the upper edge of the cutter 43 is adapted to rotate and also act to clamp the fruit in position to prevent its turning when acted upon by the cutter.

As particularly shown in Fig. 3, it will be seen that each of the clamping flanges is provided with an annular downwardly extending flange which is adapted to register and extend into the open mouth of chuck cups 52 and to bear against the marginal edge of the fruit peel. The chuck cups are cylindrical and are detachably secured by bolts 53 to the outer face of drum 54. This drum, as here shown, is formed with a series of flat longitudinal side faces upon which the chuck cups 52 may be radially secured.

In order to accommodate ejectors 55, each of the cups is formed with slots extending longitudinally of their side walls and in radial relation to the rotating axis of the drum shaft 56. The ejectors are in the shape of blades, particularly disclosed in Fig. 2 of the drawings, and mounted in the rear of the drum so that they will successively pass through the cups and wedge the fruit out upon a conveyer belt 57.

The drum 54 is fixed to rotate with the shaft 56 which is rotatably secured within bearings 58 and 59 mounted upon the front face of the uprights 10 and 11. A belt 60 passes around a pulley 61 mounted to rotate free upon the shaft 56 to afford a speed reduction for a small pulley 62 secured to a jack-shaft 63 and connected therewith by the belt. The jack-shaft is horizontally mounted within bearings 64 which are fastened upon the rear face of the inclined timbers 13 of the uprights. This shaft is driven from any suitable source of power. The eccentric shaft is driven by a belt 65 which passes around a small pulley 66 fastened to pulley 61 and around a large pulley 67 keyed to the shaft 20. The cutter shafts 36, 37 and 38 are simultaneously driven by belts 68 passing around the flanged pulleys 39 and around a large pulley 69 secured upon the jack-shaft.

It is evident that the bearings 31, 32 and 35 are adapted to have vertical movement as well as the cutters which are secured at their lower ends. In order to produce such a movement, the frame member 42 is pivotally mounted upon the jack-shaft and thereby confines the cutters in a given path of travel as they are reciprocated by means of the eccentrics upon the shaft. In order to maintain the belts 68 upon the pulleys 39, idler pulleys 70 are mounted upon the frame 42 and hold the belts in their properly alined positions during the radial movement of the frame. Guide bars 71 and 72 are provided to slidably support the frame throughout its path of travel.

In order to insure that the drum will be intermittently rotated and thereafter locked in its advanced position, a crank arm 73 is secured at the outer end of the eccentric shaft 20 and connected by a pitman rod 74 to a radial pawl arm 75. This arm is rotatably mounted upon the main shaft 56 and is fitted with a pawl 76 which operates by gravity to register with ratchet teeth formed upon the periphery of a ratchet wheel 77. This wheel is fixed upon the shaft 56 and when the pawl is in engagement with the teeth will prevent its rotation. A series of perforations 78 are formed through the ratchet wheel and are adapted to receive a lock pin 79 reciprocably mounted within a bearing 50 secured to the upright 10. The pin 79 extends through the bearing and is engaged at its rear end by the downwardly extending arm of a bell crank 81. The opposite arm of said bell crank is connected with a push rod 82 which extends vertically and passes through the end frame portion of the swinging frame 42. As particularly shown in Fig. 1, helical springs 83 and 84 are mounted around the rod and disposed upon opposite sides of the frame member, the spring 83 being limited in its downward movement by a collar 85. In this manner the oscillating movement of the frame will act to reciprocate the pin 79 to move it in and out of the perforations 78 in the ratchet wheel. When the pin is in register with one of these perforations the drum will be locked against rotation, this locking action being in synchronism with the downward movement of the cutters.

Reference being had to Figs. 3 and 4, it will be seen that the cutters 43 are substantially semi-circular and that their cutting faces coincide with the contour of the inner wall of the peel of citrus fruit, as indicated by the numeral 86. These cutters are formed with a single blade which is slightly twisted, as shown in Fig. 4, and will readily bore into the meat of the fruit to remove the pulp and juice.

In operation, the halves of citrus fruit are placed within the chuck cups 52 upon the drum, care being exercised to place fruit of the same diameter within cups of corresponding sizes. After the fruit has been positioned with its peel downwardly in the cups, movement of the drum 54 in the direction of the arrow —a— will bring the cups in a vertically alined position with the rotating axis of the cutters. As soon as the fruit has been carried to this point, the eccentric disks 23 and 24 upon the eccentric shaft 20 will swing with their throw downwardly and cause the cutter heads to be moved downwardly in a substantially vertical line of travel. These heads comprise the cutter shafts, the brackets 40, the upper bearings designated by the numerals 31, 32 and 35, the clamping members 50, and the cutters 43. As these cutters move down, the frame 42 will swing from the shaft 63 and, due to the pivot shaft 41 upon which the brackets are mounted, will cause the cutters to enter the open mouth of the cups. As they pass downwardly, the clamping flange 50 will become seated around the upper face of the cup and extend therein. This will act to guide the cutter and center it as well as clamp the fruit section in position. As the cutter head is further lowered, the spring 44 around the cutter shaft will compress and permit the cutter blade to extend downwardly into the fruit. These cutters are simultaneously rotated, as they move downwardly, by means of the shaft 63 and the pulleys around which the belts 68 pass. After the eccentric disks have reached the bottom of their throw, they will gradually retract the cutter blades to their original uppermost position. This will raise the swinging frame member 42 and relieve the push rod 82 in a manner to release the lock pin 79 from the perforations in the ratchet wheel 77. During the downward movement of the cutters, other of the chuck cups are filled and, after the cutters have moved to their retracted position, will be drawn into the path of their travel at which time they will be acted upon by the action of the cutters previously described. As the drum rotates, the peel will fall out onto the conveyer 57 and will be positively ejected from the cups by means of the tapered ejector blade 55 which passes through the slots formed through the walls of the cups. A case 87 partially incloses the drum, as particularly shown in Fig. 2, and catches the pulp and juice. In Fig. 1 the drum is removed in order to more clearly disclose the construction of the apparatus.

It will thus be seen that the apparatus here disclosed will effectively handle a large quantity of fruit in a semi-automatic manner and separate the peel and pulp with precision of operation which will insure that the pulp will not be contaminated by the peel when separated.

While I have shown the preferred construction of my citrus fruit pulp and peel separator as now known to me, it will be understood that various changes in the combination, construction and arrangement of parts may be made by those skilled in the art without departing from the spirit of the invention.

I claim:

1. A citrus fruit pulp and peel separating machine, comprising means adapted to press against the cut edge of the peel for holding the half of a citrus fruit, and cutting means whereby the pulp will be separated from the peel.

2. A citrus fruit pulp and peel separating machine, comprising cups within which the halves of citrus fruit may be placed, automatically acting means adapted to pass into the mouths of said cups and press against the cut edges of the peels for securing said fruit portions within the cups, and cutter members adapted to separate the pulp from the peels while thus secured.

3. A citrus fruit pulp and peel separating machine, comprising a plurality of cups adapted to receive the halves of citrus fruit, means adapted to pass into the mouths of said cups and press against the cut edges of the peels for automatically clamping the fruit within the cups, means for intermittently bringing the cups and the clamping means to register with each other, and reciprocating cutters adapted to enter the fruit and separate the pulp from the peel thereof.

4. A citrus fruit pulp and peel separating machine, comprising a horizontally mounted and rotatable drum, a plurality of cups formed around the outer face of said drum and adapted to receive the halves of citrus fruit, means whereby said drum may be intermittently moved, means for locking the drum during its intervals of rest, clamping means adapted to pass into the mouths of said cups in a manner to hold the fruit against rotation during the cutting operation, and reciprocating cutters adapted to act upon the fruit to separate the pulp from the peel while the drum is locked.

5. A citrus fruit pulp and peel separating machine, comprising a horizontally mounted and rotatable drum, a plurality of cups formed around the outer face of said drum and adapted to receive the halves of citrus fruit, means whereby said drum may be intermittently moved, means for locking the drum during its intervals of rest, reciprocating cutters adapted to act upon the fruit to separate the pulp from the peel while the drum is locked, and clamping means adapted to pass into the mouth of said cup in a manner to hold the fruit against rotation during the cutting operation.

6. A citrus fruit pulp and peel separating machine, comprising a horizontally mounted and rotatable drum, a plurality of cups formed around the outer face of said drum and adapted to receive the halves of citrus fruit, means whereby said drum may be intermittently moved, means for locking the drum during its intervals of rest, reciprocating cutters adapted to act upon the fruit to separate the pulp from the peel while the drum is locked, clamping means adapted to pass into the mouth of said cup in a manner to hold the fruit against rotation during the cutting operation, and means whereby the peel may be positively ejected from the cups after the pulp has been removed.

7. A citrus fruit pulp and peel separating machine, comprising a rotating drum, rows of fruit cups arranged longitudinally upon the outer periphery of said drum and at intervals therearound, means for intermittently rotating the drum a distance equal to the circumferential space between the rows of cups, means for locking the drum against rotation during its interval of rest, clamping members adapted to be reciprocated and brought into register with the mouth of the cups in a manner to secure the halves of citrus fruit against rotation therein, cutter members having a semi-circular cutting edge adapted to coincide with the inner contour of the fruit peel, means whereby said cutters may be intermittently moved into said cups to separate the pulp from the peel of fruit, means for continuously rotating said cutters during its movement into the cups, and means whereby the peel of the fruit may be automatically ejected from the cups after the pulp has been removed.

In testimony whereof I have signed my name to this specification.

JOHN D. HOWE.